Patented Mar. 24, 1936

2,034,896

UNITED STATES PATENT OFFICE 2,034,896

CATALYSTS FOR OXIDATION REACTIONS AND METHODS OF PREPARING THE SAME

William S. Calcott and William A. Douglass, Pennsgrove, N. J., assignors to E. I. du Pont de Nemours & Company, Wilmington, Del., a corporation of Delaware No Drawing. Application April 1, 1932, Serial No. 602,627

19 Claims. (Cl. 23—234)

This invention relates to improvements in catalysts and more particularly to catalysts which are effective in oxidation reactions and to processes for producing the catalysts. It relates, more specifically, to catalysts for use in the partial oxidation of naphthalene, and particularly to the production of phthalic acid anhydride by the vapor phase oxidation of naphthalene in the presence of an oxygen containing gas and a catalyst.

Many attempts have been made to produce a catalyst for the partial oxidation of hydrocarbons, some of them employing vanadium compounds. Such catalysts have been found to be generally unsatisfactory for the reason that they do not fulfill all of the desired requirements. The requirements for a satisfactory catalyst are as follows:

(1) High capacity; by which is meant the ability to continuously oxidize, to the desired products, a large amount of hydrocarbon per unit volume of catalyst and per unit of time without decrease in rate over extended periods of time without necessity for reactivation or replacement.

(2) Mechanical stability; by which is meant sufficient rigidity of form to resist crumbling or breaking into smaller particles during the normal handling during preparation and charging of the converter, and to resist packing during use. In addition, the catalytically active material should be so thoroughly distributed or bound that there is no tendency for dusting either in handling or in actual use in the converter.

(3) Thermal stability; by which is meant resistance to change in physical form, such as sintering, swelling or excessive contraction, under the temperature conditions of use.

The factors of greatest importance in the economic manufacture of phthalic anhydride by the oxidation of naphthalene are: (1) high capacity or maximum production per unit volume of catalyst material and per unit of time over extended periods of time; and (2) stability of the catalyst and maintenance of its high capacity without the necessity for interrupting production for reactivation or renewal of the catalyst mass. The importance of these factors will be readily appreciated from a consideration of the fact that a large part of the cost of the product is due to labor and fixed charges on the expensive equipment required.

An object of the present invention is to provide a catalyst having none of the objectionable features of the catalysts of the prior art. Another object is to produce a catalyst having satisfactory capacity, thermal stability and mechanical stability. A further object is to provide a novel method of producing vanadium oxide catalysts. Other and further objects are to produce a new composition of matter and to advance the art. Other objects will appear hereinafter.

These objects may be accomplished according to the following invention which comprises precipitating hydrated vanadium pentoxide by means of nitric acid, from a solution of ammonium meta-vanadate containing suspended catalytically inert material, filtration from the mother liquor containing ammonium nitrate, mixing the solids to a uniform paste preferably with the addition of a concentrated sugar solution, extrusion into conglomerates of the desired size, drying to remove water, and final hardening of the catalyst conglomerates by heating to approximately 660° C. to burn out organic material and to partially fuse the vanadium pentoxide which thereby serves as a binder. The inert material employed should be uniformly porous, should have a physical character such that the $V_2O_5$ will adhere thereto substantially as readily as to a material comprising a form of fused alumina known as Alundum and preferably have a particle size greater than 200 mesh.

Satisfactory catalysts having a vanadium pentoxide concentration varying from 20-75% can be made by this procedure, by a proper selection of the inert material, conditions of precipitation of the hydrated vanadium pentoxide, ratio of organic matter used, the temperature of the final heating and control of the particle size of the inert. Catalysts produced in this manner are superior to those heretofore employed, possess none of the disadvantages thereof, and have the necessary qualifications enumerated above such as high capacity and mechanical and thermal stability. This high capacity appears to be due to their relatively high vanadium pentoxide concentration, porosity of the catalyst conglomerates, and the large effective surface area presented by the catalyst to the reactant gases. The mechanical stability of the catalyst conglomerates so produced appears to be due, at least partially, to the binding action of the partially fused vanadium pentoxide and the adherence thereof to the inert particles. The catalyst conglomerates have sufficient mechanical strength so that there is no tendency toward dusting or loss of catalytically active material. They do not disintegrate when dropped from a height of several feet onto a hard surface, and do not crumble when packed to a depth of several feet. The thermal stability of the catalyst conglomerates produced according to our method appears to be due primarily to two factors: (1) the dilution of the catalytically active material with an inert diluent, thereby preventing excessively high temperatures caused by local reactions; (2) the porous or honey combed structure of the conglomerates; and (3) the ready adherence of the $V_2O_5$ to the inert material.

The use of the sugar and the subsequent drying and burning out of the organic matter gives the particles a uniformly porous or honey combed structure. The density of this new type of catalyst is so controlled, during the various steps of its preparation, that no appreciable change in density occurs during use, thereby eliminating the objectionable changes in volume of a fused catalyst such as has heretofor been employed but at the same time retaining the advantages of the high capacity and mechanical strength of a fused catalyst.

For the purpose of illustrating the preferred method of preparing our new catalysts the following examples are given:

*Example 1.*—120 parts ammonium meta-vanadate were dissolved in 3000 parts of water by heating. When solution was complete, 94 parts Alundum (through 150 mesh) were added and the mixture efficiently agitated during the addition of 80 parts 70% $HNO_3$. Heating was discontinued and the mixture allowed to cool gradually to ordinary room temperature with agitation. The resultant mixture was filtered with suction to a cake containing approximately 40% solids. The filtrate had a pH of 1.6 and contained a total of 0.45 parts $V_2O_5$ corresponding to a loss of 0.5%. The filtered cake was then uniformly mixed with 15 parts glucose solution containing 86.6% solids and extruded through a die 5.2 mm. in diameter. The extruded material was dried in an air oven at 100° C. for approximately 10 hours. The dried material had an average diameter of 3.8–3.9 mm. or approximately 69% of the undried material. The dried conglomerates were placed in a furnace heated to approximately 675° C. for 5–10 minutes. This treatment resulted in complete dehydration, burning out of the organic material and partial fusion of the vanadium pentoxide. The heated conglomerates had an average diameter of 3.2 mm., approximately 62% of the undried extruded material and contained about 50% $V_2O_5$. The mechanical stability of the resultant product was excellent.

The catalyst was charged into a tubular converter in which molten metal was used for heat dissipation. With an air-naphthalene ratio of 30:1 by weight, a yield of 73% of the theoretical of excellent quality phthalic anhydride was obtained. After 380 hours' operation, there was no detectable change in resistance to flow of vapors, showing excellent thermal stability. In addition, inspection of the catalyst, after this period of operation, showed no appreciable change in physical form.

*Example 2.*—100 parts $NH_4VO_3$ were dissolved in 2500 parts water at boiling temperature and, after the addition of 25 parts of Alundum (through 150 mesh), hydrated vanadium pentoxide was precipitated by the addition of 68 gms. 70% nitric acid. The same procedure as given in Example 1 was employed and the resulting product containing approximately 75% $V_2O_5$ was found to have a very satisfactory capacity for the oxidation of naphthalene as well as good mechanical and thermal stability.

*Example 3.*—120 parts ammonium meta-vanadate were dissolved in 3000 parts boiling water and, after the addition of 100 gms. titanium dioxide (through 150 mesh), hydrated vanadium pentoxide was precipitated by the addition of 80 parts 70% $HNO_3$. The catalyst, prepared as described in Example 1, contained approximately 48% $V_2O_5$ and had satisfactory capacity and mechanical and thermal stability.

*Example 4.*—91 parts $NH_4VO_3$ were dissolved in 2275 parts boiling water, 130 gms. Alundum (through 150 mesh) were added and the hydrated $V_2O_5$ precipitated by the addition of $HNO_3$. The finished catalyst, prepared as in Example 1, contained approximately 35% $V_2O_5$ and had satisfactory capacity and thermal stability and fairly satisfactory mechanical stability.

*Example 5.*—52 parts $NH_4VO_3$ were dissolved in 1300 parts boiling water, 160 gms. Alundum (through 150 mesh) were added and hydrated $V_2O_5$ precipitated by the addition of nitric acid. The finished catalyst, prepared as in Example 1, contained approximately 20% $V_2O_5$ and had satisfactory capacity and thermal stability, but was somewhat deficient in mechanical stability.

*Example 6.*—Hydrated $V_2O_5$ was precipitated from a solution of 130 gms. $NH_4VO_3$ in which had been suspended 100 gms. 30–40 mesh Alundum. The catalyst, prepared according to the aforedescribed procedure, had very satisfactory capacity and mechanical and thermal stability.

From a consideration of the results obtained in the foregoing examples, it will be apparent that the inert material employed must not only be catalytically inert but should also have a particle size greater than 200 mesh and must be of such physical character that the $V_2O_5$ in solid or molten form will adhere thereto substantially as readily as to Alundum.

The many advantages of the catalysts produced in accordance with the methods above described may be considered to flow from the following actions taking place: when the inert material is mixed with the ammonium meta-vanadate solution and the inert material is porous, the solution penetrates into the pores thereof; when the nitric acid is added it also penetrates the pores and precipitates the vanadium pentoxide within the pores of the inert material as well as upon the outer surface thereof; when the inert material is not porous the vanadium pentoxide is of course precipitated only upon the surface thereof. By precipitating the vanadium pentoxide in solution with the inert material in suspension, and by agitation during the precipitation and cooling, a homogeneous mixture is obtained with the vanadium pentoxide uniformly distributed in and on the inert material. By forming this homogeneous mixture into a paste, conglomerates of any desired size can be readily formed without the use of expensive equipment or manipulation.

The glucose or sugar or similar organic substance aids in the production of a paste and, by uniformly mixing the organic matter with the catalyst material and then drying and burning out the organic material from the preformed conglomerates, the catalyst material is given a uniformly porous or honey combed structure which prevents excessive shrinking and provides large surface areas for contact with the reactant gases.

The partial fusion of the vanadium pentoxide binds the vanadium pentoxide more firmly to the inert material thereby preventing sweeping of the catalyst from the inert, and furthermore, serves to bind the inert particles together to form hardened catalyst conglomerates having great mechanical stability.

It will be accordingly apparent that our method of preparing a new catalyst involves the following new features: (1) precipitation of $V_2O_5$ in the presence of a material which is inert catalytically, of the proper size (greater than 200 mesh) and to which the $V_2O_5$ adheres substantially as readily as to Alundum; (2) preforming of catalyst material to the desired sized conglomerates by extrusion of an easily worked moist paste; (3) use of an organic matter subsequently burned out to cause porosity and prevent excessive shrinkage; (4) hardened to the desired ruggedness before charging into the catalytic apparatus. The improvement in the process of manufacturing phthalic anhydride results from employing a catalyst having improved mechanical and thermal stability and high potential capacity, thereby permitting operation with a high space production without interruption for reactivation or renewal of the catalyst.

While we have described specific catalysts and specific methods of making and using the same, it will be apparent that many changes may be made in the proportions and materials employed without departing from the spirit of our invention. Accordingly, the scope of our invention is to be limited solely by the appended claims construed as broadly as is permissible in view of the prior art.

We claim:

1. The process of making a catalyst for oxidation reactions which comprises precipitating vanadium pentoxide in and on a catalytically inert material of the group consisting of fused alumina and titanium dioxide, mixing therewith a sugar, and then heating to such a temperature as will drive off moisture and the sugar and partially fuse the vanadium pentoxide whereby a hardened uniformly porous mass is obtained.

2. The process of making a catalyst for oxidation reactions which comprises precipitating vanadium pentoxide in and on a porous catalytically inert material comprising fused alumina, mixing the resulting product with a sugar to form an easily worked paste, forming the paste into conglomerates of desired size, and then heating the conglomerates to such a temperature as will drive off moisture and the sugar and partially fuse the vanadium pentoxide.

3. The process of making a catalyst for oxidation reactions which comprises mixing with a hot aqueous solution of ammonium meta-vanadate a porous catalytically inert material comprising fused alumina, then adding nitric acid with agitation to precipitate substantially all the vanadate as vanadium pentoxide in and on the inert material, and separating the solid material from the solution.

4. The process of making a catalyst for oxidation reactions which comprises mixing with a hot aqueous solution of ammonium meta-vanadate a catalytically inert material of the group consisting of fused alumina and titanium dioxide, adding nitric acid with agitation to precipitate substantially all of the vanadate as vanadium pentoxide on the inert material, separating the solids from the solution, mixing the solids with a sugar, and then heating to remove moisture and the sugar and to partially fuse the vanadium pentoxide.

5. The process of making a catalyst for oxidation reactions which comprises mixing with a hot aqueous solution of ammonium meta-vanadate a catalytically inert material of the group consisting of fused alumina and titanium dioxide, adding nitric acid with agitation to precipitate vanadium pentoxide on the inert material, gradually cooling the mixture to room temperatures with agitation, separating the solid matter from the solution, mixing the solid matter with a solution of a sugar, and then heating to remove moisture and the sugar and to partially fuse the vanadium pentoxide.

6. The process of making a catalyst for oxidation reactions which comprises mixing with a hot aqueous solution of ammonium meta-vanadate a catalytically inert material of the group consisting of fused alumina and titanium dioxide, adding nitric acid with agitation to precipitate vanadium pentoxide on the inert material, gradually cooling the mixture to room temperatures with agitation, separating the solid matter from the solution by filtration, mixing the solid matter with a solution of a sugar, forming the mixture into conglomerates of desired size, and then heating the conglomerates to drive off moisture and the sugar and to partially fuse the vanadium pentoxide.

7. The process of making a catalyst for use in the oxidation of naphthalene to phthalic anhydride which comprises dissolving ammonium meta-vanadate in hot water, mixing with the solution porous catalytically inert fused alumina of about 150 mesh, adding nitric acid to the mixture with agitation to precipitate vanadium pentoxide in and on the fused alumina, allowing the mixture to gradually cool to room temperatures with agitation, separating the solid matter from the solution by filtration, mixing the solid material with a concentrated glucose solution, extruding the mixture through a die of about 5.2 mm. in diameter, drying the extruded material with hot air and then heating the dried material to approximately 675° C. for a sufficient length of time to burn out the organic matter and to partially fuse the vanadium pentoxide.

8. A catalyst for oxidation reactions comprising uniformly porous conglomerates consisting of particles of catalytically inert material of the group consisting of fused alumina and titanium dioxide coated on their inner and outer surfaces with and bound together by partially fused vanadium pentoxide.

9. A catalyst for oxidation reactions comprising uniformly porous conglomerates of uniform size consisting of particles of porous catalytically inert material comprising fused alumina uniformly coated on their outer surfaces with and bound together by precipitated vanadium pentoxide which is at least partially fused.

10. A catalyst for oxidation reactions comprising uniformly porous conglomerates of uniform size consisting of particles of porous catalytically inert material consisting of fused alumina uniformly coating on their outer surfaces with and bound together by precipitated vanadium pentoxide which is at least partially fused, the particles being of a size greater than 200 mesh and the vanadium pentoxide amounting to at least 20% of the conglomerate.

11. A catalyst for oxidation reactions comprising uniformly porous conglomerates of uniform size consisting of particles of porous catalytically inert material consisting of fused alumina uniformly coated on their outer surfaces with and bound together by precipitated vanadium pentoxide which is at least partially fused, the particles being of a size of about 30 to about 150 mesh and the vanadium pentoxide amounting to about 35 to about 75% of the conglomerate.

12. A catalyst for oxidation reactions comprising uniformly porous conglomerates of about 3.2 mm. in diameter consisting of particles of porous catalytically inert material consisting of fused alumina uniformly coated on their outer surfaces with and bound together by precipitated vanadium pentoxide which is at least partially fused, the particles being of a size of about 30 to about 150 mesh and the vanadium pentoxide amounting to about 35 to about 75% of the conglomerate.

13. The process of making a catalyst for oxidation reactions which comprises mixing with an aqueous solution of ammonium meta-vanadate a porous catalytically inert material consisting of fused alumina, then adding a precipitant with agitation to precipitate substantially all the vanadate as vanadium pentoxide in and on the inert material, separating the solid material from the solution and heating the solid material to about 660° C. to drive off moisture and partially fuse the vanadium pentoxide.

14. The process of making a catalyst for oxidation reactions which comprises mixing with an aqueous solution of ammonium meta-vanadate a porous catalytically inert material comprising fused alumina, adding a precipitant with agitation to precipitate substantially all of the vanadate as vanadium pentoxide in and on the inert material, separating the solids from the solution, mixing the solids with a sugar, and then heating to about 660° C. to remove moisture and the sugar and to partially fuse the vanadium pentoxide.

15. The process of making a catalyst for use in the oxidation of naphthalene to phthalic anhydride which comprises dissolving ammonium meta-vanadate in hot water, mixing with the solution porous catalytically inert fused alumina of about 150 mesh, adding a precipitant to the mixture with agitation to precipitate vanadium pentoxide in and on the alumina, allowing the mixture to gradually cool to room temperatures with agitation, separating the solid matter from the solution by filtration, mixing the solid material with a concentrated glucose solution, extruding the mixture through a die of about 5.2 mm. in diameter, drying the extruded material with hot air and then heating the dried material to approximately 675° C. for a sufficient length of time to burn out the organic matter and to partially fuse the vanadium pentoxide.

16. A catalyst for oxidation reactions comprising uniformly porous conglomerates consisting of particles of a relatively inert, relatively infusible, rigid, porous carrier coated with and bound together by partially fused vanadium pentoxide.

17. A catalyst for oxidation reactions comprising uniformly porous conglomerates consisting of particles of a relatively inert, relatively infusible, rigid, porous carrier coated with and bound together by partially fused vanadium pentoxide, the particles being of a size of about 30 to about 150 mesh.

18. A catalyst for oxidation reactions comprising uniformly porous conglomerates consisting of particles of a relatively inert, relatively infusible, rigid, porous carrier coated with and bound together by partially fused vanadium pentoxide, the vanadium pentoxide amounting to about 35% to about 75% of the conglomerate.

19. A catalyst for oxidation reactions comprising uniformly porous conglomerates consisting of particles of a relatively inert, relatively infusible, rigid, porous carrier coated with and bound together by partially fused vanadium pentoxide, the particles being of a size of about 30 to about 150 mesh and the vanadium pentoxide amounting to about 35% to about 75% of the conglomerate.

WILLIAM S. CALCOTT.
WILLIAM A. DOUGLASS.